INVENTORS
THOMAS W. MILTON &
ROBERT H. MILTON

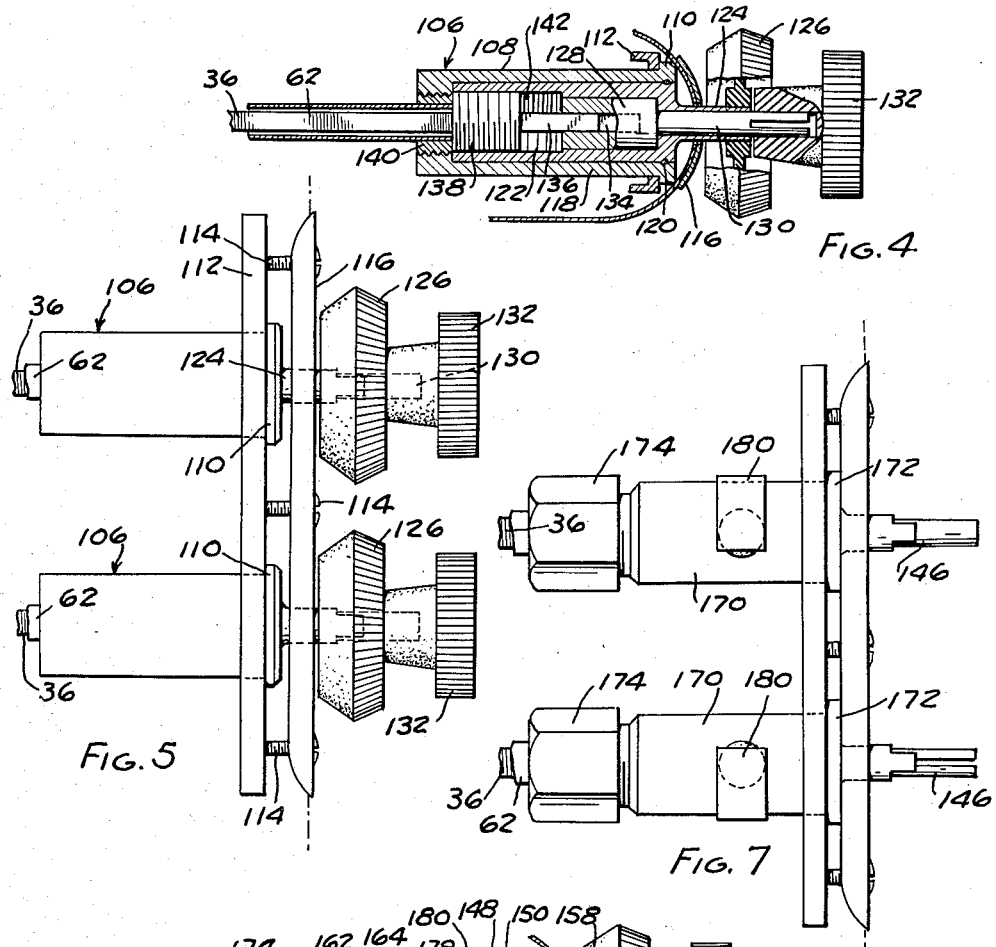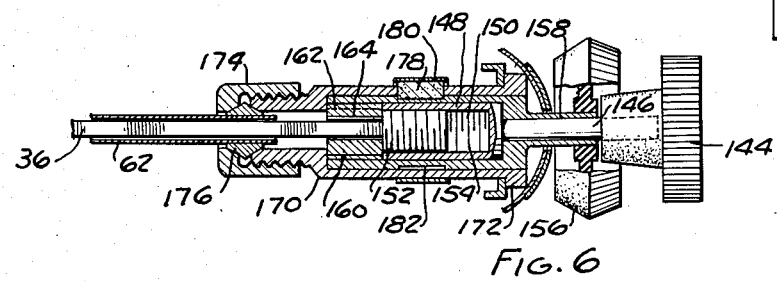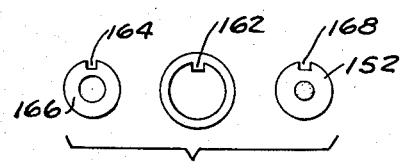

United States Patent Office 2,919,599
Patented Jan. 5, 1960

2,919,599

REMOTE CONTROL MECHANISM FOR AUTOMOTIVE ACCESSORIES

Thomas W. Milton and Robert H. Milton, Detroit, Mich.

Application December 5, 1955, Serial No. 550,945

4 Claims. (Cl. 74—479)

This invention relates to a control mechanism adapted to be positioned for example on the instrument panel of a vehicle to control the position of a remotely positioned automotive accessory movable in intersecting planes. Examples of automotive accessories, position of which it is necessary to control in two planes are rear view mirrors and spot lights positioned at such a point on the vehicle that it is impossible for the driver or occupant of the vehicle to reach the member to move it to a desired adjusted position without moving from the normal seating position.

Our co-pending application Serial No. 522,671 illustrates a rear view mirror embodying a control mechanism whereby the rear view mirror may be adjusted horizontally and vertically by actuating a control member positioned on the instrument panel of the vehicle.

This invention is directed to the use of adjacently disposed independently operable control members which may be actuated selectively to vary the horizontal and vertical angular position of a remotely positioned rear view mirror or spotlight.

An object of our invention resides in the provision of simplified separately operable control members for adjusting the angular position of or aiming a rear view mirror or spotlight in horizontal and vertical planes.

Another object of our invention is to provide a simplified rear view mirror and spot light position actuating mechanism which may be manufactured economically.

Still a further object of our invention is to provide a compact remote control actuating mechanism having adjacently disposed control members for selectively actuating from a remote point, a member which must be adjusted horizontally and vertically.

Still another object of our invention resides in the provision of a compact and rugged mechanism for supporting a spot light in such a manner that it may be readily adjusted horizontally and vertically from a remote point.

Another object of our invention is to provide a remote control mechanism whereby a remotely positioned member may be adjusted angularly in intersecting planes by rotational or axial movement of a motion transmitting member, separate, preferably coaxially disposed manually operable controls being provided for rotating or shifting axially the motion transmitting member.

Other objects and advantages of this invention will be apparent from the following description, taken in conjunction with the accompanying drawings, submitted for purposes of illustration only and not intended to define the scope of the invention, reference being had for that purpose to the subjoined claims.

In the drawings, wherein similar characters refer to similar parts throughout the several views:

Fig. 4 is a longitudinal sectional view of one embodiment of our improved remote control mechanism.

Fig. 5 is a plan view of the remote control mechanism illustrated in Fig. 4.

Fig. 6 is a view similar to Fig. 4 illustrating a modified form of our improved remote control mechanism.

Fig. 7 is a plan view of the embodiment illustrated in Fig. 6, and

Fig. 8 is a series of three views illustrating the motion transmitting mechanism for imparting rotational and longitudinal movement to the flexible shaft in the embodiment of the invention illustrated in Figs. 6 and 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
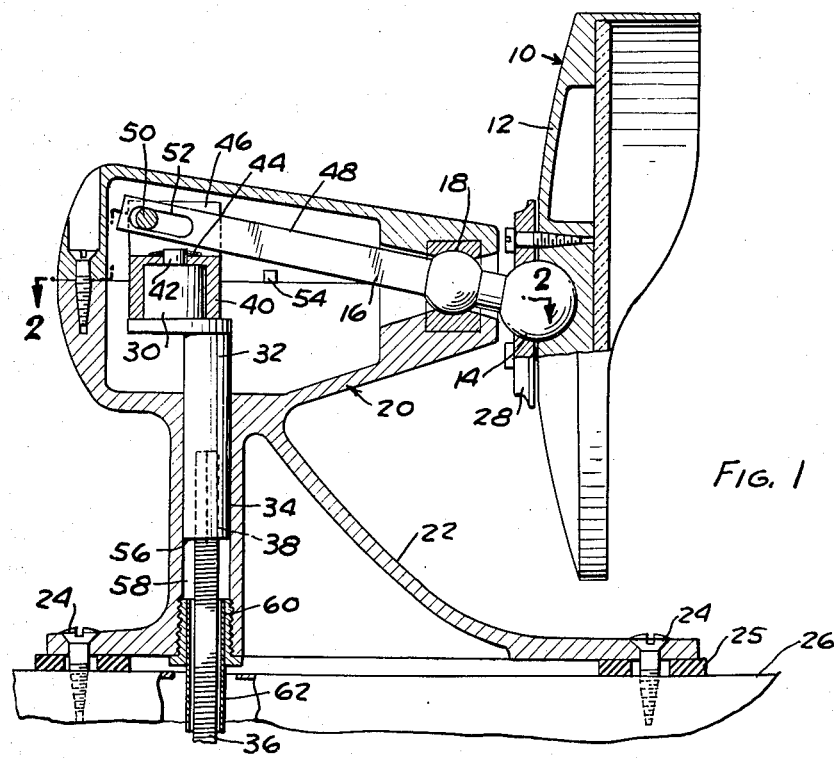
Fig. 1 is a sectional view illustrating a rear view mirror adapted to be actuated from a remote point by our improved control mechanism.

Referring now more particularly to Fig. 1 it will be noted that our remote control mechanism is illustrated as applied to a rear view mirror 10 carried by a suitable casing 12, the casing 12 is mounted on the rearward end 14 of a mirror carrying member 16 journaled at 18 in a housing 20. The housing 20 has a suitable base 22 secured in any desired manner as by screws 24 through a mounting pad 25 to a portion 26 such as a front fender or the hood of a motor vehicle. The mounting pad 25 may be contoured on its upper surface to receive the base 22, and may be contoured on its lower surface to conform with the contour of a fender or other portion of a vehicle to which it is desired to secure the rear view mirror or other device to be actuated by our remote control mechanism.

While our invention is directed particularly to rear view mirrors and spot lights mounted at any desired location on a vehicle it will be apparent that it is of greatest utility when applied to rear view mirrors or spot lights positioned forwardly of the passenger compartment to such a point that it is impossible for the driver or other occupant of the vehicle to reach the device to make desired angular adjustments while seated in the vehicle.

The casing 12 mounted on the rearward end 14 of the mirror carrying member 16 may be clamped thereto in any desired angular position by a member 28 to clamp the casing 12 to the rounded end 14 of member 16.

Any desired means may be employed to selectively adjust the angular position of the mirror horizontally and vertically about the journal point 18 of the member 16.

One illustrative embodiment of angle adjusting means adapted particularly for use with our remote control mechanism comprises an eccentric or crank 30 carried by a plunger or member 32 mounted for rotation and axial movement in a cylindrical cavity 34 formed in the base 22. The member 32 is secured at 38 to one end of a flexible shaft 36 as by welding or in any other desired manner.

A motion transmitting member in the form of a cap member 40 mounted on the eccentric 30 is apertured to receive a central projection 42 of the eccentric 30 which may be secured as by means of a fastener 44 to prevent the cap member 40 from becoming disassembled with respect to the eccentric 30. The cap member 40 is provided with upstanding flanges 46 adapted to receive therebetween the flat side walls 48 of the mirror carrying member 16. A pin 50 projecting through the flanges 46 of the cap member 40 extends through a slot 52 formed in the mirror carrying member 16 to maintain the parts in assembled relation.

Figure 2:
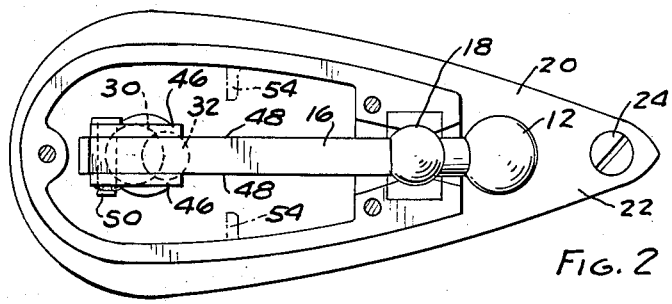
Fig. 2 is a plan view taken substantially on the line 2—2 of Fig. 1 looking in the direction of the arrows.

It will be apparent that when the member 32 is oscillated in the cylinder 34 by actuation of the flexible shaft 36 the eccentric 30 oscillates the cap 40 to shift the end of the mirror carrying member 16 remote from the end 14 thereof horizontally about the journal point 18 in the housing 20 to vary the horizontal adjustment of the mirror 10. As illustrated in Fig. 2, lugs 54 formed in the housing 20 are positioned to engage the flanges 46 of the cap member 40 to limit the oscillating movement of the member 32 to substantially a 180° arc of movement as the shaft 36 is oscillated.

Adjustment of the mirror 10 vertically is accomplished by shifting the member 32 axially in the cylindrical cavity 34 formed in the base 22. The member 32 is free to move axially in the space 58 within the cylindrical cavity 34 until it contacts fitting 60 threaded into the lower end of the cylinder 34. It will be apparent that as the member 32 shifts axially or telescopes in the cylinder 34 into the space 58, the mirror carrying member 16 is moved vertically about the journal point 18 to vary the vertical position of the mirror 10.

Flexible shaft 36 is encased in a flexible conduit 62 as a protection against weather and damage. One end of conduit 62 is secured by the fitting 60 to the portion of the base 22 defining the lower end of the cylinder 34.

Figure 3:
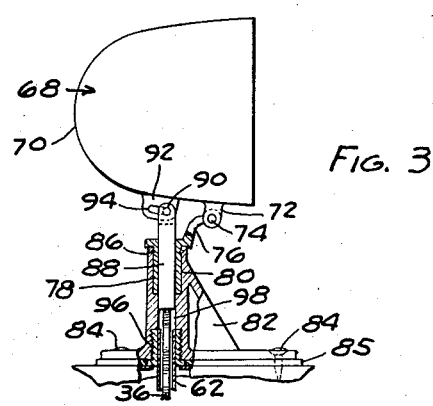
Fig. 3 is a side elevational view, partly in section of a spot light adapted to be actuated from a remote point by our improved control mechanism.

Fig. 3 illustrates a spot light 68 adapted to be actuated by our remote control mechanisms. It will be noted that the spot light 68 has a casing 70 provided with a support bracket 72 connected through a pin 74 to a bracket 76 carried by a sleeve 78 projecting into a cylinder 80 formed in a bracket 82 adapted to be secured in any desired manner as by screws 84 projecting through an adapter pad 85 to a vehicle. It will be understood that the bracket 82 may take any desired form and may be mounted in any preferred location on the vehicle.

The sleeve 78 is rotatably mounted in the cylinder 80 and is maintained in assembled relation therein by means of a snap ring 86.

The spot light 68 may be adjusted horizontally and vertically by means of our remote control mechanisms which actuates the flexible shaft 36 adapted to be secured in any desired manner as by welding to a plunger 88 rotatably and axially movable within the sleeve 78. The shaft 36 is connected through a pin 90 with a bracket 92 secured to the casing 70 of the spotlight 68. The pin 90 is movable in a slot 94 formed in the bracket 92 to permit relative movement between the pin 90 and the bracket 92 as the plunger 88 is shifted axially in the sleeve 88 to pivot the forward end of the casing 70 of the spotlight 68 about the pin 74 to vary the vertical adjustment of the spotlight.

The fitting 96 threaded into the lower end of the bracket 80 in alignment with the cylinder 80 secures the flexible conduit 62 with respect to the flexible shaft 36 and defines a clearance space 98 which determines the extent of vertical movement of the plunger 88 in the cylinder 80.

Illustrative examples of our remote control mechanisms for adjusting the horizontal and vertical angular positions of the mirror 10 or the spotlight 68 are illustrated in Figs. 4 to 8.

The opposite end of the flexible cable 36 remote from the rear view mirror 10 or the spotlight 68 extends through the flexible conduit 62 to the remote control mechanism 106.

The remote control mechanism 106 consists of a shell 108 having a flange 110 held in contact with the inner surface of the instrument panel of the vehicle by any suitable means. One such means is illustrated wherein shell 108 passes through a hole in channel plate 112 and is drawn into firm contact with the instrument panel by means of screws 114, which project through the trim plate 116 and the instrument panel. Rotatably mounted in the shell 108 is a sleeve 118 having internal threads 122 and a shank 124 at its opposite end adapted to receive a knob 126 whereby the sleeve 118 may be rotated within the shell 108. The sleeve 118 is secured against axial movement in the shell 108 by the snap ring 120.

Rotatably mounted within the sleeve 118 is a member 128 having a stem 130 projecting through the shank 124, and having a knob 132 secured thereto. A non-round cavity 134 is formed in the central portion of the rotatable member 128 to receive a matching non-round terminal 136 on the flexible shaft 36 to provide rotational driving means only. A threaded driving member 138 is fixed on the flexible shaft 36 and is threadedly mounted in the internal threads 122 of the sleeve 118 and moves axially within the sleeve 118 when the knob 126 is rotated, causing a corresponding axial movement of the flexible shaft 36. Cavity 134 is of sufficient depth to permit axial movement of the shaft 36 with predetermined limits and the space 142 permits equal axial movement of threaded member 138 within sleeve 118. The operation of this embodiment of our invention to adjust the rear view mirror or the spotlight horizontally and vertically is as follows.

To adjust the mirror 10 or spotlight 68 horizontally, the outer or centrally disposed control knob 132 is actuated to turn the stem 130 and the rotatable member 128 within the sleeve 118. This movement is transmitted through the non-round driving connection 134—136 to rotate the flexible shaft 36 in the conduit 62 to rotate the mirror control member 30 (Fig. 1) in the cylindrical cavity 34 of the base 22 of the mirror assembly. As previously described rotational movement of the member 32 operates through the eccentric 30 and cap member 40 having the flanges 46 thereon to engage the flat surfaces 48 of the mirror carrying member 16 to shift it about the journal point 18 in a horizontal plane to vary the horizontal adjustment of the mirror 10. The pin 50 projecting through the flange 46 and slidably mounted in the slot 52 maintains the units in assembled relation.

To adjust the spotlight 68 horizontally our remote control mechanism may be actuated in similar manner whereupon the flexible shaft 36 and the plunger 88 fixed thereto are rotated relative to the stationary bracket 82. Rotation of the plunger 88 operates through the pin 90 to rotate the spotlight 68, the bracket 76 carried by the sleeve 78 rotating in the cylinder 80 in unison with the plunger 88.

The spotlight may be revolved a complete revolution by merely rotating the appropriate control knob through one revolution, or the rotation may be made slower by interposing reduction gears between shaft 36 and plunger 88.

To adjust the mirror vertically knob 126 is rotated and this rotation is transmitted through shank 124 to sleeve 118 in shell 108 and since axial movement of sleeve 118 in shell 108 is prevented by snap ring 120 the threaded member 138 is compelled to move axially within sleeve 118 and carry with it flexible shaft 36 to which it is secured. This axial movement of shaft 36 is transmitted to member 32 of Fig. 1 or plunger 88 of Fig. 3 and finally to mirror 10 throuugh the medium of eccentric 30 to cap member 40 through flanges 46 to pin 50 to mirror carrying member 16.

To vary the vertical adjustment of the spotlight 68 the knob 126 of the actuating mechanism is rotated to shift the flexible shaft 36 axially to withdraw the plunger 88 into the sleeve 78 thereby pivoting the forward end of the casing 70 of the spotlight 68 about the pin 74 to elevate the beam directed by the spotlight 68.

The extent of vertical adjustment can be increased by increasing the length of the slot 94 in the bracket 92 and increasing the clearance space 98 between the bottom of the plunger 88 and a bushing 96 by which the sheath 62 surrounding the flexible shaft 36 is anchored in the bracket 82.

It will be apparent that if desired the casing of the spotlight 70 may be anchored substantially in alignment with the flexible shaft 36 and that another portion, such as the forward portion thereof, may be actuated by connecting the flexible shaft 36, for example to the sleeve 78, suitable provision being made by slots or lost motion connections to permit shifting one of the fulcrum points.

Referring now to the embodiment of our invention illustrated in Figs. 6 to 8 it will be observed that a centrally disposed knob 144 operates through a stem 146 to rotate the member 148 having internal threads 150 adapted to receive the threaded member 152 fixed to flexible shaft 36. It will thus be apparent that as the knob 144 is rotated, the threaded member 152 is shifted axially in the space 154 to move the flexible shaft 36 axially to shift for example the member 32 (Fig. 1) having the eccentric 30 and the associated linkage to raise and lower the mirror carrying member 16 about the journal point 18 to adjust the angular relation of the mirror 10 vertically.

The inner knob 156 is connected through the sleeve 158 and insert 160 which is fixed thereto and having a key 162 received in a key slot 164 formed in a member 166 which is fixed to the flexible shaft 36 so that oscillating movement of the inner knob 156 oscillates the flexible shaft 36, and at its opposite end the member 32 (Fig. 1) having the eccentric 30 thereon to shift the mirror carrying member 16 laterally in the housing 20 about the journal point 18 to vary the angular relation of the member 16 and the mirror 10 horizontally. The threaded member 152 is provided with a key slot for assembly purpose only, to permit it to pass through the otherwise obstruction of key 162 in insert 160.

In this assembly the sleeve 158 is received within a housing 170 having a flange 172 abutted by the channel 112, and having its opposite end threaded to receive a nut 174, a ferrule 176 being employed to secure the casing 62 to the housing 170. The sleeve 158 is restrained from rotating in the housing 170 by a brake 178 having a friction surface engaging the sleeve 158, and a spring 180 urging the friction surface of the brake into restraining engagement with the sleeve 158. Since the brake 178 is held in contact with the depressed surface 182 it acts also to secure the sleeve 158 against axial movement within the housing 170.

While the invention has been described with particular reference to several illustrative embodiments thereof, it will be apparent that many changes may be made therein without departing from the spirit of our invention as defined in the following claims.

We claim:

1. In a motor vehicle a rear view mirror adapted to be mounted on the vehicle at a point remote from a passenger compartment, the rear view mirror including a mirror carrying member adapted to be adjusted angularly in intersecting horizontal and vertical planes, a plunger adapted to be selectively moved rotationally and longitudinally, connecting means between said plunger and the mirror carrying member, said connecting means being so constructed and arranged that selective rotational and longitudinal movement of the plunger selectively adjusts said mirror carrying member horizontally and vertically, a flexible shaft connected to the plunger, a control mechanism positioned in the passenger compartment comprising coaxially disposed separately operable control knobs, and actuating means comprising a member operably connected to the flexible shaft, said actuating means being so constructed and arranged that rotational movement of one of said control knobs imparts rotational movement to said member operably connected to the flexible shaft and rotational movement of the other of said control knobs imparts longitudinal movement to said member operably connected to the flexible shaft to vary the horizontal and vertical adjustment of said member.

2. In a rear view mirror control mechanism for a motor vehicle, a mirror carrying member movable to horizontally and vertically adjusted positions, a plunger movable rotationally and longitudinally, connecting means between the plunger and the mirror carrying member whereby selective rotational or longitudinal movement of the plunger is translated into horizontal or vertical adjustment of the mirror carrying member, a remotely positioned control comprising a threaded member selectively movable rotationally and longitudinally, actuating mechanism comprising separately operable coaxially disposed control knobs operably connected to said remotely positioned threaded member, flexible shaft motion transmitting means between said remotely positioned threaded member and said plunger whereby rotational movement of one of said control knobs imparts rotational movement to said plunger, and rotational movement of the other control knob imparts longitudinal movement to said plunger.

3. In an actuating mechanism for a rear view mirror, a mirror carrying member shiftable angularly in intersecting planes, motion transmitting means responsive to rotational and longitudinal movement to shift said member angularly in said intersecting planes, a remotely positioned threaded control member movable rotationally and longitudinally, two separately operable coaxially disposed control knobs for imparting rotational and longitudinal movement to said threaded control member, and a single flexible shaft operably connected between said threaded control member and said motion transmitting means to selectively impart rotational and longitudinal movement to said motion transmitting means to shift said members angularly in intersecting planes.

4. A rear view mirror device for a motor vehicle comprising a casing supporting the mirror, a housing, a mirror carrying member journalled in the housing, an axially movable member having an eccentric connected to one end of the mirror carrying member for selectively moving said mirror carrying member laterally to vary the horizontal adjustment of the mirror and for moving said member vertically to vary the vertical adjustment of the mirror, a remotely positioned actuating mechanism comprising a threaded member movable rotationally and longitudinally, concentrically mounted members operably connected to the threaded member for selectively moving the threaded member rotationally and longitudinally, a flexible shaft interconnecting the threaded member and the axially movable member, and separately operable control knobs for said concentrically mounted members.

References Cited in the file of this patent

UNITED STATES PATENTS

| | | |
|---|---|---|
| 1,443,331 | Meyer | Jan. 23, 1923 |
| 1,576,168 | Whitsett | Mar. 9, 1926 |
| 2,315,260 | Lancaster | Mar. 30, 1943 |
| 2,585,399 | Mead | Feb. 12, 1952 |
| 2,614,437 | Meggitt | Oct. 21, 1952 |
| 2,623,986 | Falge | Dec. 30, 1952 |
| 3,734,997 | Frady | Feb. 14, 1956 |
| 2,855,521 | Blackstone | Oct. 7, 1958 |